(12) United States Patent
Miura et al.

(10) Patent No.: US 8,302,632 B2
(45) Date of Patent: Nov. 6, 2012

(54) MOUNT STRUCTURE OF TWO-WAY VALVE FOR FUEL TANK OF SMALL BOAT

(75) Inventors: Takayoshi Miura, Wako (JP); Tsuyoshi Kumasaka, Wako (JP); Tadaaki Nagata, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 623 days.

(21) Appl. No.: 12/393,574

(22) Filed: Feb. 26, 2009

(65) Prior Publication Data
US 2009/0229691 A1    Sep. 17, 2009

(30) Foreign Application Priority Data
Mar. 13, 2008    (JP) .................. 2008-064952

(51) Int. Cl.
*B63B 19/08*    (2006.01)
*F16K 24/00*    (2006.01)

(52) U.S. Cl. .............. 137/899.2; 137/493; 440/88 A; 440/88 F; 440/89 R; 114/55.51

(58) Field of Classification Search ............. 137/493, 137/493.6, 493.8, 899.2; 114/55.51; 440/88 A, 440/88 F, 89 R
See application file for complete search history.

(56) References Cited

U.S. PATENT DOCUMENTS

| | | | | |
|---|---|---|---|---|
| 3,976,096 A | * | 8/1976 | Kass et al. | 137/493.2 |
| 4,677,929 A | * | 7/1987 | Harris | 114/211 |
| 5,088,947 A | * | 2/1992 | Whitley et al. | 440/88 R |
| 5,273,466 A | * | 12/1993 | Thompson | 440/88 R |
| 5,386,843 A | * | 2/1995 | Church | 137/202 |
| 5,762,093 A | * | 6/1998 | Whitley, II | 137/199 |
| 6,167,911 B1 | * | 1/2001 | Diamond | 137/899.2 |
| 6,895,880 B2 | * | 5/2005 | Nakajima et al. | 114/55.51 |
| 2002/0053309 A1 | * | 5/2002 | Hattori | 114/55.51 |
| 2002/0160671 A1 | * | 10/2002 | Berthiaume et al. | 440/88 |
| 2003/0129890 A1 | * | 7/2003 | Nagata et al. | 440/88 F |
| 2006/0183386 A1 | * | 8/2006 | Yazaki et al. | 440/89 R |

FOREIGN PATENT DOCUMENTS

| | | |
|---|---|---|
| JP | 05-338449 A | 12/1993 |
| JP | 2003-137169 A | 5/2003 |
| JP | 2004-098946 A | 4/2004 |

* cited by examiner

*Primary Examiner* — John K Fristoe, Jr.
*Assistant Examiner* — Kevin Murphy
(74) *Attorney, Agent, or Firm* — Birch, Stewart, Kolasch & Birch, LLP

(57) ABSTRACT

A mount structure for a two-way valve for a fuel tank of a small boat for improving mountability of the two-way valve while ensuring strength of the deck. The interior space of the boat, which is formed of a hull and a deck, is provided with an engine, a fuel tank, and a duct. One end of the duct is attached to the wall surface of the deck with a mount member. The two-way valve is connected to the breather hose of the fuel tank, and attached to the mount member at one end of the duct from the interior space of the boat. The mount member is integrally provided with a mount pipe for the tube which opens the two-way valve outside the deck.

20 Claims, 6 Drawing Sheets

MOUNT STRUCTURE OF TWO-WAY VALVE FOR FUEL TANK OF SMALL BOAT

CROSS-REFERENCE TO RELATED APPLICATIONS

The present application claims priority under 35 USC 119 to Japanese Patent Application No. 2008-064952 filed on Mar. 13, 2008 the entire contents of which are hereby incorporated by reference.

BACKGROUND OF THE INVENTION

1. Field of the Invention

The present invention relates to a structure for mounting a two-way valve for a fuel tank for a small boat.

2. Description of Background Art

A small boat is known that includes an interior space defined by a hull and a deck, which contains an engine, a fuel tank for the engine, and a duct (105) for aerating the interior space to the outside. Such a small boat includes one end of the duct (105) that is attached to the wall surface of the deck with a mount member (104). See, for example, see FIG. 8 of JP-A No. 2004-98946.

Another type of small boat is known that includes a breather hose (64) of the fuel tank connected to a fuel supply port member (62) so as to be open to the atmosphere through a breath hole (72b) formed in a fuel supply cap (65). See, for example, see FIGS. 4 and 5 of JP-A No. 2003-137169.

Another related art discloses a two-way valve (13) combined with two check valves in a vent passage (7) between a fuel tank (T) and a canister (C). See, for example, JP-A No. H5-338449.

In the small boat disclosed in JP-A No. 2003-137169, the breather hose (64) of the fuel tank is constantly opened to the atmosphere through the breath hole (72b), which may undesirably cause the fuel vapor generated in the fuel tank to be increasingly discharged to the atmosphere.

Generally in the aforementioned small boat, the two-way valve disposed in the breather hose of the fuel tank is attached to the wall surface of the deck with a bracket, and the mount pipe for the tube which opens the two-way valve outside the deck is directly attached to the wall surface of the deck.

The above-structured boat requires the hole for mounting the bracket or for the mount pipe to be formed in the deck, which may deteriorate the mountability of the two-way valve. Such a hole may further deteriorate the strength of the deck unnecessarily.

SUMMARY AND OBJECTS OF THE INVENTION

It is an object of an embodiment of the present invention to provide a mount structure of a two-way valve for a fuel tank of a small boat for improving the mountability of the two-way valve and ensuring the strength of the deck.

For the purpose of establishing the aforementioned object, an embodiment of the present invention provides a mount structure of a two-way valve for a fuel tank of a small boat having an interior space defined by a hull and a deck, which contains an engine, a fuel tank for the engine, and a duct for aerating the interior space to the outside. The small boat has one end of the duct attached to a wall surface of the deck with a mount member. A two-way valve is connected to a breather hose of the fuel tank, and is mounted to the mount member at one end of the duct from the interior space.

Preferably, the mount member is integrally provided with a mount pipe for a tube which opens the two-way valve outside the deck. The mount pipe is opened outside the deck.

In the mount structure of the two-way valve for the fuel tank of the small boat according to an embodiment of the present invention, the two-way valve is connected to the breather hose of the fuel tank so as to reduce the discharge amount of the fuel vapor generated in the fuel tank significantly.

The two-way valve is attached to the mount member at one end of the duct to be mounted to the wall surface of the deck from the interior space of the boat such that the two-way valve and the duct are mounted simultaneously.

This makes it possible to markedly improve the mountability of the two-way valve compared with the related art.

As the hole for mounting the two-way valve is not required, the strength of the deck may be ensured.

An embodiment of present invention provides such effects as improving the mountability of the two-way valve and ensuring the strength of the deck.

The mount member is integrally provided with a mount pipe for the tube which opens the two-way valve outside the deck, and the mount pipe is opened outside the deck. Thus, the work for forming the hole for the mount pipe is not required, thus improving the mountability. Furthermore, the hole for the mount pipe is not required to be formed in the deck, thus improving the strength of the deck.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
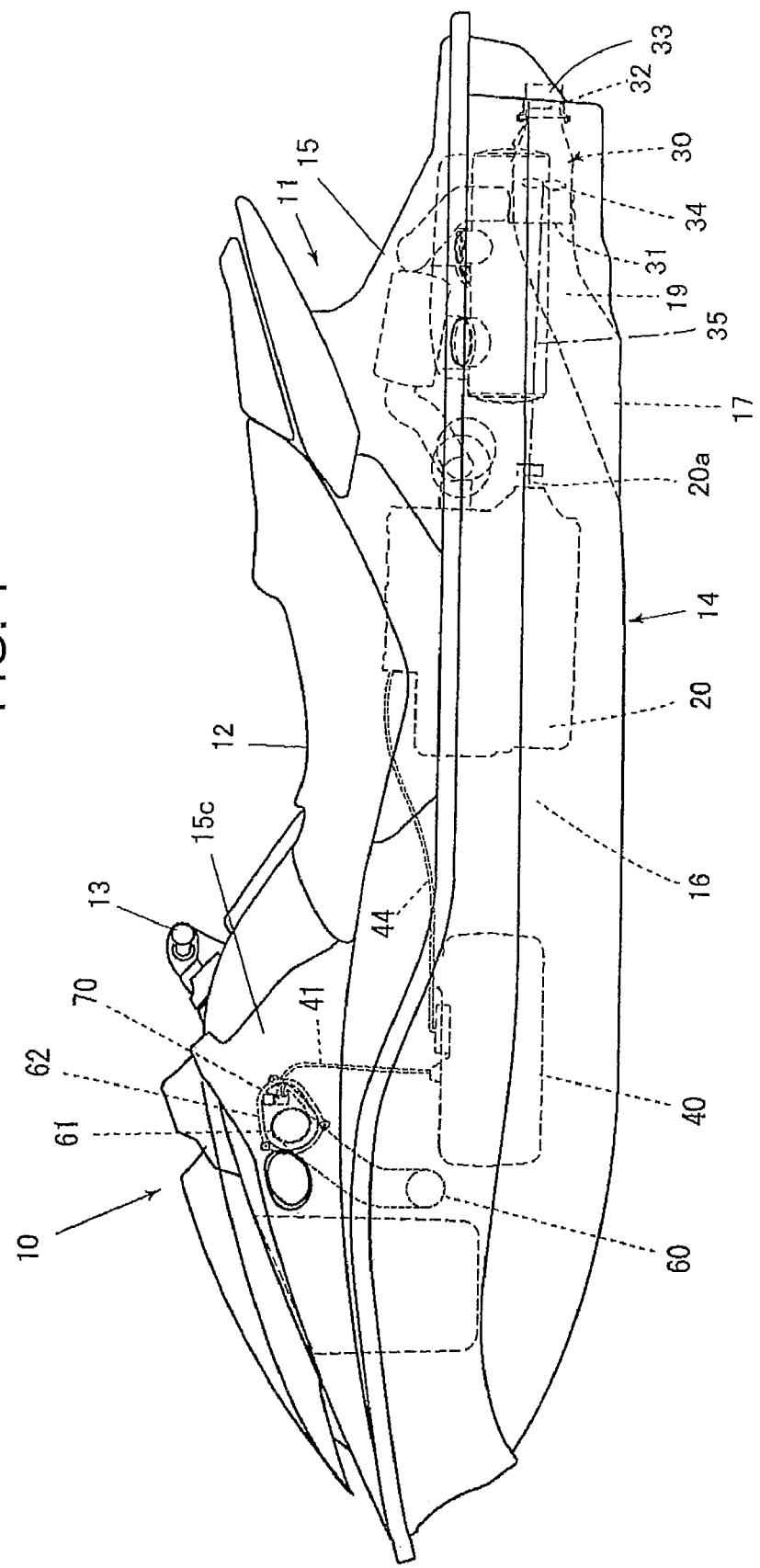
FIG. 1 is a side view schematically showing an example of a small boat which employs an embodiment of the mount structure of a two-way valve for a fuel tank of a small boat according to the present invention.

An embodiment of a mount structure of a two-way valve for a fuel tank of a small boat according to the present invention will be described referring to the drawings.

Figure 2:
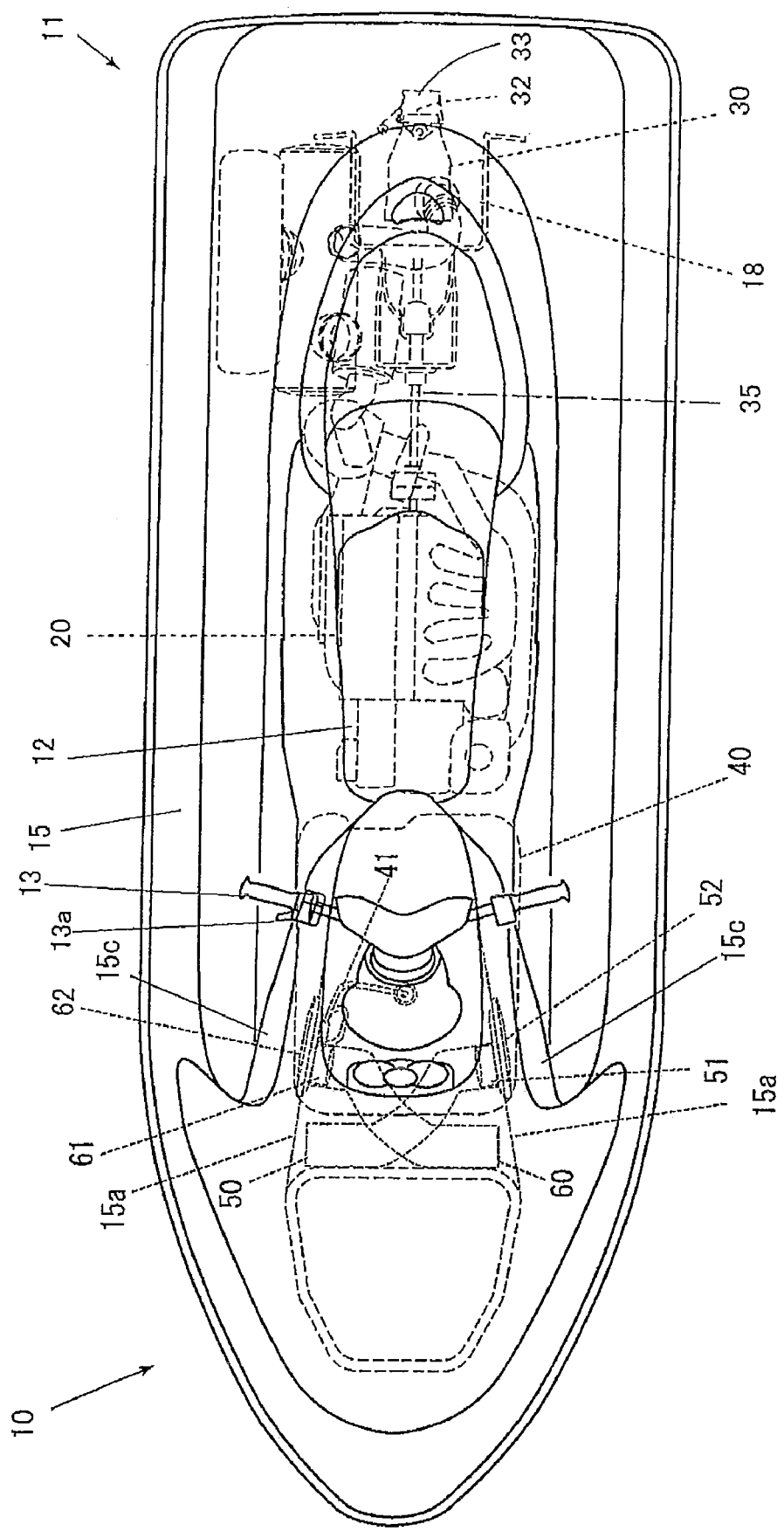
FIG. 2 is a schematic plan view shown in FIG. 1.

Referring to FIGS. 1 and 2, a small boat 10 is a saddle-ride type small boat which allows an occupant to be seated on a seat 12 on a boat body 11 and to operate the boat by use of a steering handlebar 13 with a throttle lever 13a.

The boat body 11 has a floating structure having an interior space 16 formed by connecting a hull 14 to a deck 15. An engine 20 is mounted on the hull 14, and a jet pump 30 (jet propulsion pump) as propulsion means to be driven by the engine 20 is disposed to the rear of the hull 14 in the interior space 16.

A flow passage 19 extends from an intake port 17 and is open to the bottom of the boat to a pump chamber 18 (see FIG. 2). The flow passage 19 is formed to the rear of the hull 14. The jet pump 30 communicating with the flow passage 19 is disposed inside the pump chamber 18.

The jet pump 30 includes an opening 31 in communication with the flow passage 19, a jet port 32 and a nozzle 33 through which water is blown to the rear of the boat body, and an impeller 34 disposed inside the flow passage extending from the opening 31 to the jet port 32. A shaft 35 of the impeller 34 is connected to an output shaft 20a of the engine 20. When the engine 20 drives the impeller 34 to rotate, water taken through the intake port 17 is blown from the jet port 32 via the nozzle 33 to drive the boat body 11 forward. The engine speed of the engine 20, that is, the driving force derived from the jet pump 30 is defined by the rotating operation of the throttle lever 13a. The nozzle 33 is associated with the steering handlebar 13 with a wire (not shown) so as to be rotatably operated to change the course.

Referring to FIGS. 1 to 4, the interior space 16 contains a fuel tank 40 for the engine 20, and ducts 50, 60 for aerating the interior space 16 to the outside (atmosphere outside the interior space 16). Ends of the ducts 50, 60, that is, 51 and 61 are attached to a wall surface 15a of a deck 15 with mount members 52 and 62, respectively. The ducts 50 and 60 may be used as either the intake ducts or the exhaust ducts.

The fuel tank 40 is provided with a breather hose 41 to which a two-way valve 70 is connected.

The two-way valve 70 is attached to the mount member 62 at the end 61 of the duct 60 from the interior space 16.

FIG. 5(a) to 5(f) illustrate the mount member 62 wherein FIG. 5(a) is a front view, FIG. 5(b) is a sectional view taken along line b-b, FIG. 5(c) is a sectional view taken along line c-c, FIG. 5(d) is a sectional view taken along line d-d, FIG. 5(e) is a sectional view taken along line e-e, and FIG. 5(f) is a sectional view taken along line f-f.

Figure 3:
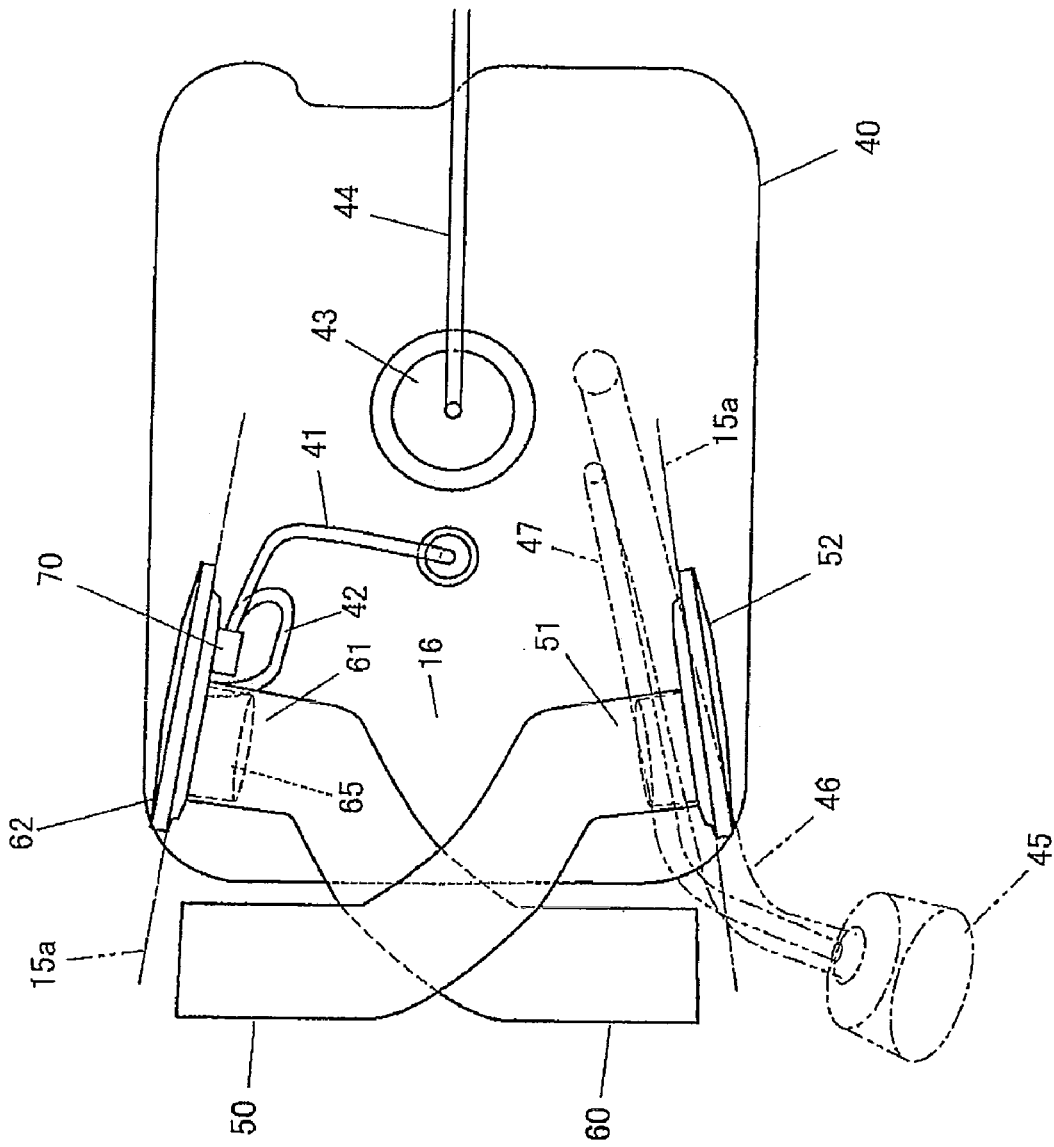
FIG. 3 is a schematic plan view of an essential portion.
Figure 4:
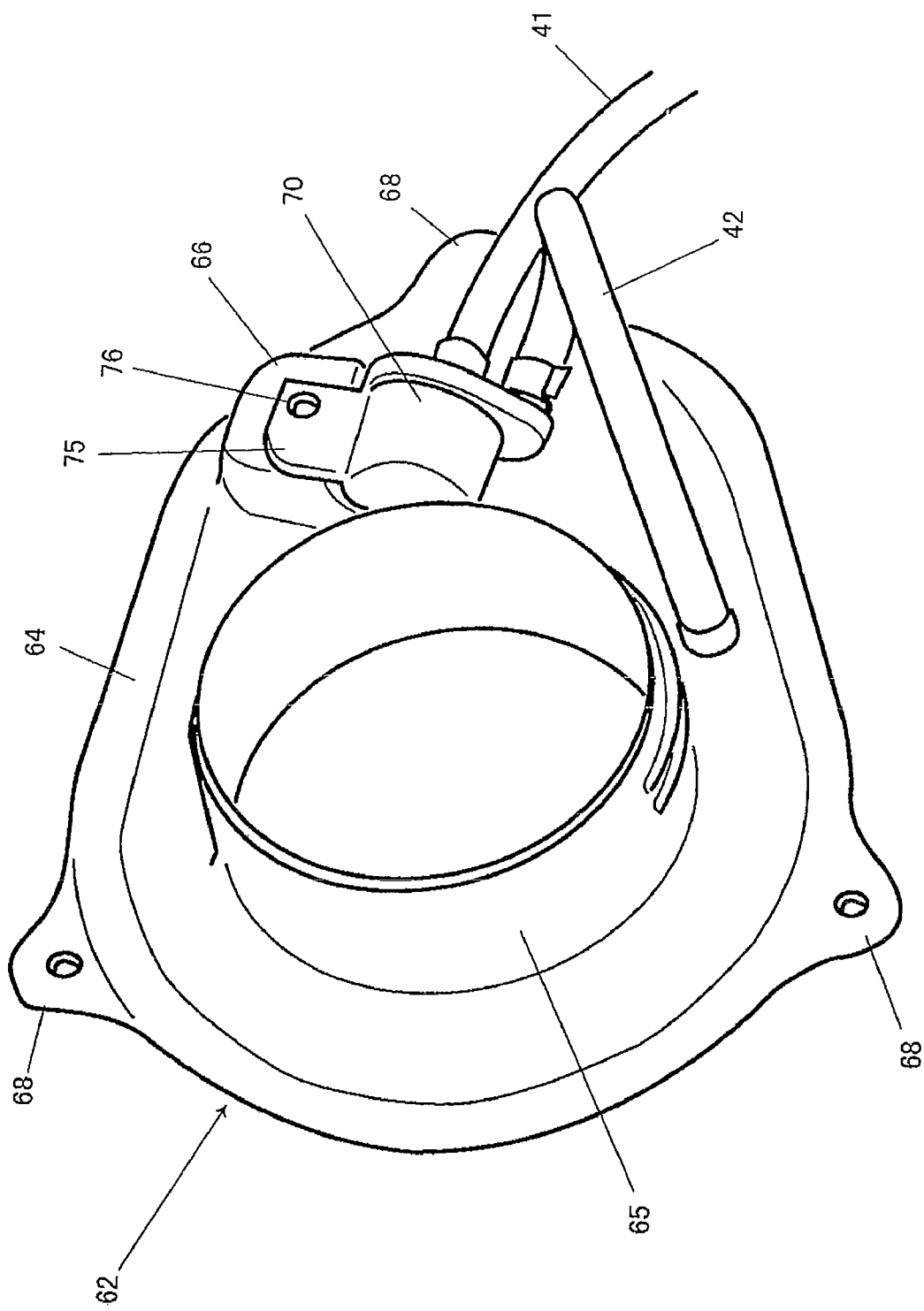
FIG. 4 is a perspective view of a mount member of the duct to which the two-way valve is attached.
Figure 5:
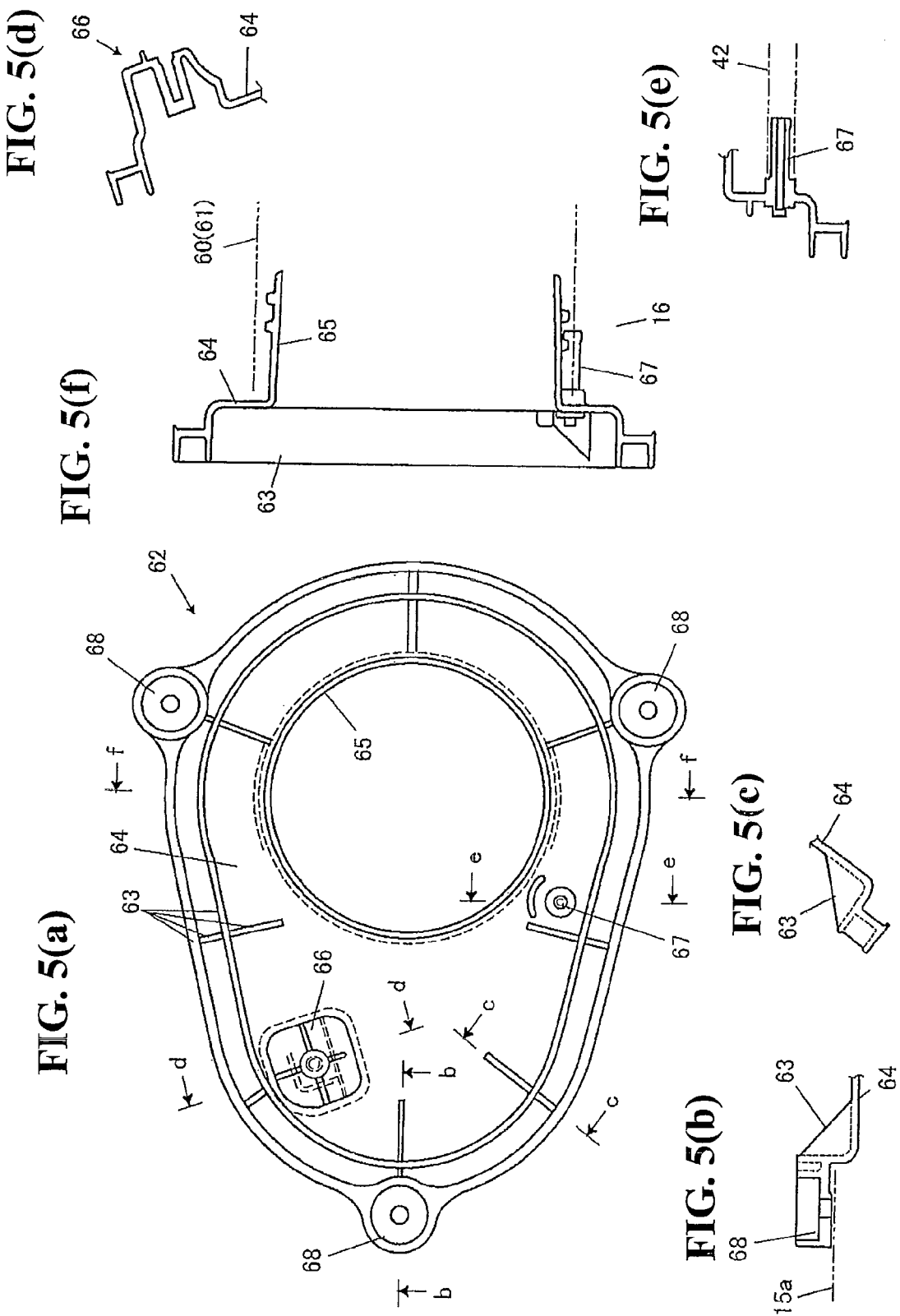
FIG. 5(a) shows a front view of the mount member.
FIG. 5(b) is a sectional view taken along line b-b of the mount member.
FIG. 5(c) is a sectional view taken along line c-c of the mount member.
FIG. 5(d) is a sectional view taken along line d-d of the mount member.
FIG. 5(e) is a sectional view taken along line e-e of the mount member.
FIG. 5(f) is a sectional view taken along line f-f of the mount member.

Referring to FIGS. 4 to 5(f), the mount member 62 includes a plate portion 64 reinforced with a rib 63, a tubular duct mount portion 65 integrally formed with a back surface (at the side of the interior space 16) of the plate portion 64, a mount portion 66 integrally formed with the back surface for mounting the two-way valve 70, a mount pipe 67 integrally formed with the plate portion 64 to penetrate from the back surface to the upper surface thereof for a tube 42 which opens the two-way valve 70 outside the deck 15 (atmosphere), and screwing portions 68 for fixing the mount member 62 to the wall surface 15a (see FIG. 3) of the deck 15 with screws.

The mount member 62 has the duct mount portion 65 connected to the end 61 (air intake port, for example) of the duct 60. The two-way valve 70 is mounted to the mount portion 66 of the two-way valve 70. The breather hose 41 is connected to one connector portion 73 (see FIG. 6) of the two-way valve 70. The other connector portion 74 (see FIG. 6) of the two-way valve 70 is connected to the mount pipe 67 with the tube 42. Thereafter, the screwing portions 68 are screwed to the wall surface 15a of the deck 15 from outside so as to fix the mount member 62 to the deck 15. The wall surface 15a of the deck 15 may be exposed by removing a side cover 15c of the deck 15 (see FIGS. 1 and 2).

The structure of the mount member 52 of the duct 50 is substantially the same as that of the mount member 62 except that the mount portion 66 and the mount pipe 67 for the two-way valve 70 are not provided.

Figure 6:
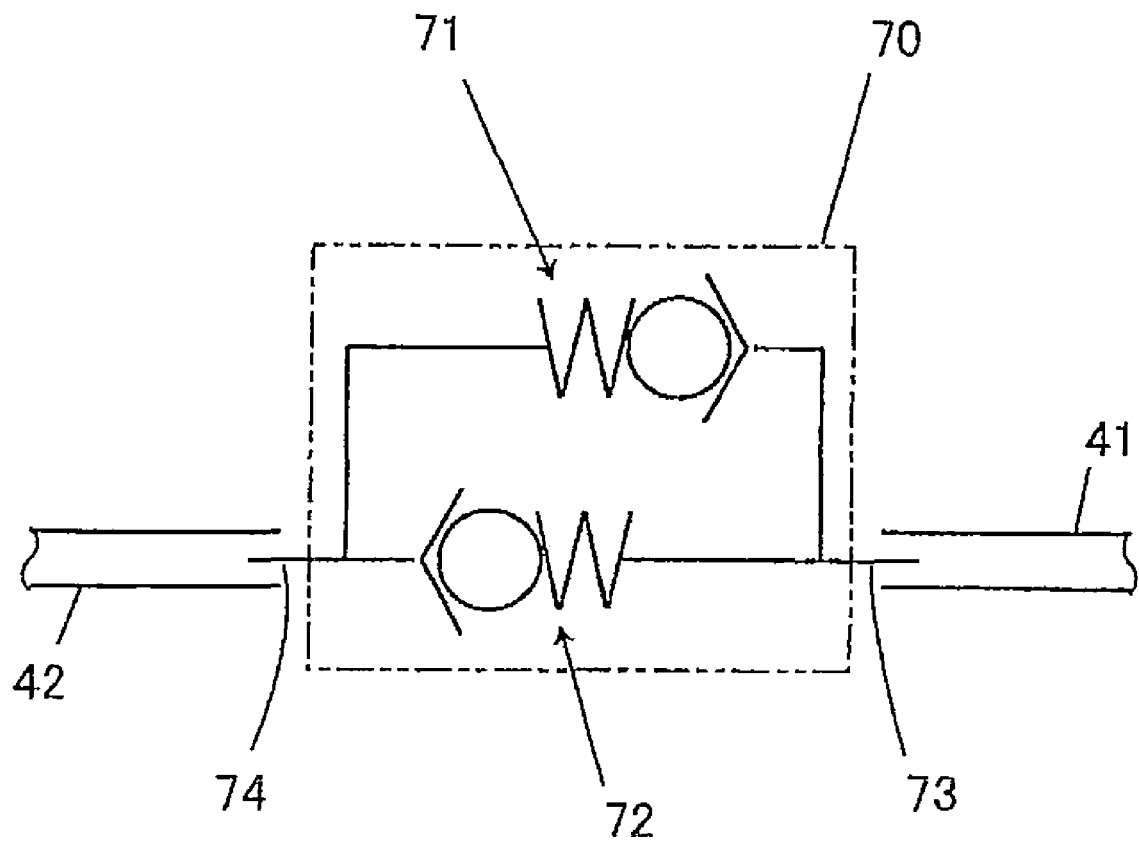
FIG. 6 is a view showing an inner structure of the two-way valve.

Referring to FIG. 6 (as has been well known), the two-way valve 70 has an inner structure formed by combining two check valves 71 and 72. The breather hose 41 is connected to one of the connector portions, that is, the connector portion 73, and the tube 42 is connected to the other connector portion 74. As the other end of the tube 42 is connected to the mount pipe 67 of the mount member 62, the other connector portion 74 of the two-way valve 70 is opened outside the deck 15 (atmosphere).

When the pressure in the fuel tank 40 reaches the predetermined pressure (to be appropriately set in accordance with setting of the valve-opening pressure of the two-way valve 70), the fuel vapor in the fuel tank 40 is allowed to be discharged to the atmosphere through one of the check valves, that is, the check valve 71 while it is opened. When the pressure in the fuel tank 40 becomes lower than the predetermined pressure (to be appropriately set in accordance with setting of the valve-opening pressure of the two-way valve 70), air flows into the fuel tank 40 through the other check valve 72 while it is opened.

The fuel vapor in the fuel tank 40 is discharged to the atmosphere while the check valve 71 is opened. As a result, the discharge amount of the fuel vapor to the atmosphere may be significantly reduced.

Referring to FIG. 4, the two-way valve 70 is fixed to the mount portion 66 of the mount member 62 through a screw hole 76 formed in a mount projecting piece 75.

Referring to FIG. 3, a fuel pump 43 is provided for the fuel tank 40 for supplying the fuel to the engine 20 through the fuel supply pipe 44 (see FIG. 1). A fuel supply port 45 is provided for filling the fuel into the fuel tank 40. A fuel supply pipe 46 and an air bleeding pipe 47 are provided.

In the mount structure of the two-way valve for the fuel tank of the small boat, the two-way valve 70 is connected to the breather hose 41 of the fuel tank 40 so as to significantly reduce the amount of the fuel vapor generated in the fuel tank 40 discharged to the atmosphere.

If the small boat 10 of the aforementioned type which is mostly utilized for leisure-time activity is likely to be capsized it can be immediately recovered by the occupant. The two-way valve 70 ensures to prevent leakage of the fuel from the fuel tank 40 through the breather hose 41 caused by capsize of the boat.

The two-way valve 70 is fixed to the mount member 62 at one end of the duct 60 attached to the wall surface 15a of the deck 15 from the interior space 16 such that the duct 60 and the two-way valve 70 are simultaneously mounted.

This makes it possible to considerably improve the mountability for the two-way valve 70 as compared with the related art.

The hole for mounting the two-way valve is not required to be formed in the deck 15, thus ensuring the strength of the deck 15.

In the embodiment, the mountability of the two-way valve 70 may be improved while ensuring the strength of the deck 15.

The mount member 62 is integrally provided with the mount pipe 67 for the tube 42 which opens the two-way valve 70 outside the deck to open the mount pipe 67 outside the deck. This may eliminate the need of forming the hole for the mount pipe (67), thus improving the mountability. As the hole for the mount pipe is not required, the strength of the deck 15 may further be improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A mount structure for a two-way valve which is operatively communicating with a fuel tank of a small boat for venting the fuel tank to the atmosphere outside the small boat, said small boat having an interior space defined by a hull and a deck, said interior space having an engine, a fuel tank and at least one aerating duct for aerating the interior space of the boat to the atmosphere outside the boat, one end of the aerating duct being attached to a wall surface of the deck with a mount member, said mount member containing a two-way valve mounted in said mount member, said two-way valve communicating with the atmosphere outside the boat and a breather hose connecting the two-way valve to the fuel tank.

2. The mount structure of a two-way valve for a fuel tank of a small boat according to claim 1, wherein the mount member is integrally provided with a mount pipe for a tube which opens the two-way valve outside the deck, and the mount pipe is opened outside the deck.

3. The mount structure of a two-way valve for a fuel tank of a small boat according to claim 1, wherein the mount member includes a plate portion reinforced with a rib, a tubular duct mount portion integrally formed with a back surface of the plate portion and a mount portion integrally formed with the back surface for mounting the two-way valve.

4. The mount structure of a two-way valve for a fuel tank of a small boat according to claim 3, wherein the mount member further includes a mount pipe integrally formed with the plate portion to penetrate from the back surface to the upper surface thereof for attaching a tube for opening the two-way valve to the outside.

5. The mount structure of a two-way valve for a fuel tank of a small boat according to claim 1, wherein the mount member includes a duct mount portion connected to the end of the aerating duct.

6. The mount structure of a two-way valve for a fuel tank of a small boat according to claim 1, wherein the breather hose is connected to a first connector portion of the two-way valve with a second connector portion of the two-way valve being connected to a mount pipe with a tube.

7. The mount structure of a two-way valve for a fuel tank of a small boat according to claim 1, wherein the two-way valve is formed by combining two check valves with the breather hose being connected to a first connector portion and a first end of a tube being connected to a second connector portion with a second end of the tube being connected to a mount pipe of the mount member for opening outside the deck.

8. The mount structure of a two-way valve for a fuel tank of a small boat according to claim 1, wherein, when the fuel tank has a pressure higher than a predetermined pressure, the two-way valve discharges fuel vapor to the atmosphere.

9. The mount structure of a two-way valve for a fuel tank of a small boat according to claim 1, wherein when the fuel tank has a pressure lower than a predetermined pressure, the two-way valve permits air to flow into the fuel tank.

10. The mount structure of a two-way valve for a fuel tank of a small boat according to claim 1, wherein the two-way valve is connected to the breather hose of the fuel tank for reducing the amount of fuel vapor generated in the fuel tank discharged to the atmosphere.

11. A mount structure operatively communicating with a two-way valve for a fuel tank of a small boat, comprising:
a mount member;
an aerating duct adapted for aerating an interior space of the boat to the atmosphere, one end of the aerating duct being attached to a wall surface of a boat deck with said mount member;
a breather hose adapted to be operatively connected to the fuel tank;
said mount member containing a two-way valve including a first connector and a second connector, said breather hose being operatively connected to the first connector;
a tube including a first end operatively connected to the second connector of the two-way valve, wherein said tube includes a second end open to the atmosphere.

12. The mount structure of a two-way valve for a fuel tank of a small boat according to claim 11, wherein the mount member is integrally provided with a mount pipe for the tube which opens the two-way valve to the atmosphere.

13. The mount structure of a two-way valve for a fuel tank of a small boat according to claim 11, wherein the mounting member includes a plate portion reinforced with a rib, a tubular duct mount portion integrally formed with a back surface of the plate portion and a mount portion integrally formed with the back surface for mounting the two-way valve.

14. The mount structure of a two-way valve for a fuel tank of a small boat according to claim 13, wherein the mounting member further includes a mount pipe integrally formed with the plate portion to penetrate from the back surface to the upper surface thereof for attaching the tube for opening the two-way valve to the atmosphere.

15. The mount structure of a two-way valve for a fuel tank of a small boat according to claim 11, wherein the mount member includes a duct mount portion connected to the end of the duct.

16. The mount structure of a two-way valve for a fuel tank of a small boat according to claim 11, wherein the mount member is integrally provided with a mount pipe for the tube for opening the two-way valve to the atmosphere for improving the mountability of the tube to the mount member.

17. The mount structure of a two-way valve for a fuel tank of a small boat according to claim 11, wherein the two-way valve is formed by combining two check valves with the breather hose being connected to the first connector portion and the first end of the tube being connected to the second connector portion and the second end of the tube being connected to the mount pipe of the mount member for opening to the atmosphere.

18. The mount structure of a two-way valve for a fuel tank of a small boat according to claim 11, wherein when the fuel tank has a pressure higher than a predetermined pressure, the two-way valve discharges fuel vapor to the atmosphere.

19. The mount structure of a two-way valve for a fuel tank of a small boat according to claim 11, wherein when the fuel tank has a pressure lower than a predetermined pressure, the two-way valve permits air to flow into the fuel tank.

20. The mount structure of a two-way valve for a fuel tank of a small boat according to claim 11, wherein the two-way valve is connected to the breather hose of the fuel tank for discharging to the atmosphere and thus reducing the amount of fuel vapor generated in the fuel tank.

* * * * *